United States Patent
McNall et al.

(10) Patent No.: US 8,294,940 B1
(45) Date of Patent: Oct. 23, 2012

(54) UPDATING DATA IN A ONE-TIME PROGRAMMABLE DATA STORAGE DEVICE

(75) Inventors: Walter Lee McNall, Meridian, ID (US); Randall D. Briggs, Boise, ID (US)

(73) Assignee: Marvell International Ltd. (BM)

( * ) Notice: Subject to any disclaimer, the term of this patent is extended or adjusted under 35 U.S.C. 154(b) by 1162 days.

(21) Appl. No.: 12/129,076

(22) Filed: May 29, 2008

Related U.S. Application Data

(60) Provisional application No. 60/941,425, filed on Jun. 1, 2007.

(51) Int. Cl.
*G06K 15/00* (2006.01)
*G06F 3/12* (2006.01)

(52) U.S. Cl. ...................................... 358/1.16; 358/1.13

(58) Field of Classification Search ........................ None
See application file for complete search history.

(56) References Cited

U.S. PATENT DOCUMENTS

| | | | | |
|---|---|---|---|---|
| 5,283,613 A | * | 2/1994 | Midgley, Sr. | 399/9 |
| 5,289,210 A | * | 2/1994 | Takayanagi | 347/14 |
| 5,318,370 A | * | 6/1994 | Nehowig | 400/613 |
| 5,995,774 A | * | 11/1999 | Applegate et al. | 399/27 |
| 2004/0151024 A1 | * | 8/2004 | Fricke et al. | 365/177 |
| 2004/0190714 A1 | * | 9/2004 | Masui et al. | 380/43 |

* cited by examiner

*Primary Examiner* — Gabriel Garcia

(57) ABSTRACT

A system and method are disclosed for updating data stored in a one-time programmable (non-rewritable) non-volatile storage device ("OTP"). The OTP is segmented so that updated data may be written to unused areas. Valid data may be differentiated from stale data using a data recognition technique such as tallying or indexing. According to a tallying technique, an updated event count may be obtained by counting the number of blown bits in the OTP. Each time the event occurs, the next bit is blown. According to an indexing technique, each bit in an index corresponds to a data block in the OTP. When updated data is written to the next (empty) data block in order in the OTP, the corresponding (next) index bit is blown. A valid data set may be located by counting the number of blown bits in the index.

20 Claims, 8 Drawing Sheets

UPDATING DATA IN A ONE-TIME PROGRAMMABLE DATA STORAGE DEVICE

RELATED APPLICATION

This application claims the benefit of U.S. Provisional Application No. 60/941,425, filed on Jun. 1, 2007, which is incorporated herein by reference.

BACKGROUND

1. Technical Field

The present disclosure relates to integrated circuits, and more particularly to updating data in a non-volatile data storage device.

2. Related Art

Integrated circuits (ICs) utilize non-volatile data storage ("memory") to store data that must be retained even if power is removed from the IC. In many applications, the data stored in the non-volatile memory is updatable by the IC. For example, a device may include an IC to tally the number of occurrences of an event (or events) through the lifetime of the device. The IC may update event occurrence data in the non-volatile memory each time the event occurs. The updated data is retained when the device is powered down and the event count can be resumed when the device is powered-up again. An example of updateable data is a printer page count, i.e., tallying the total number of pages printed through the life of a printer. The most recent printer page count must be retained when the printer is turned off or unplugged. Updateable data may also include universal serial bus (USB) endpoint data, external component identification data, and/or many other types of data.

ICs utilize rewritable non-volatile memory to store updateable data that must be retained when the device is powered down. Examples of rewritable non-volatile memory include electrically erasable programmable read only memory (EEPROM), flash memory, and ferroelectric random access memory (FeRAM). Rewritable non-volatile memory may be incorporated into an IC when it is manufactured or may be added to a system as a discrete element. In many applications, only a relatively small amount of rewritable non-volatile memory (e.g., 2 Kbytes) is required to store all of the updateable data through the device's life. However, extra processing steps are required to incorporate even a small amount of rewritable non-volatile memory into an IC. These extra processing steps often increase the cost of the IC disproportionately. Adding rewritable non-volatile memory as a discrete element in a system is also expensive and is often not an option. An improved approach is desirable.

BRIEF SUMMARY

The following embodiments relate to systems and methods of updating data stored in a one-time programmable (non-rewritable) non-volatile storage device ("OTP"). The OTP is segmented so that updated data may be written to unused areas. Valid data may be differentiated from stale data in the OTP using a valid data recognition technique.

In a preferred embodiment, an apparatus comprises a one-time programmable (OTP) data storage device and a processor. The processor updates an allocated memory area in the data storage device by writing updated data to unused areas in the allocated memory area. The processor also distinguishes updated data from out-of-date data previously stored in the allocated memory area. The processor may: distinguish updated data from the out-of-date data by locating a first unblown bit in the allocated memory area; locate the first unblown bit in the allocated memory area by incrementing a pointer value and determining whether respective corresponding bits are unblown until the pointer value corresponds to an unblown bit; distinguish the updated data from the out-of-date data by locating a first unblown bit in an index in the data storage device; update the index by locating a first unblown bit in the index and blowing the unblown bit when the allocated memory area is updated by writing the updated data to an unused data block; and/or determine whether the allocated memory area includes unused data blocks based on an index of bits, wherein each bit in the index corresponds to a respective data block. The index may include a plurality of bits corresponding to respective data blocks in the allocated memory area. Examples of data that may be updated include a printer page count, a printer identification, universal serial bus endpoint data, and printer cartridge identification data. Any other type of updatable data may be updated. If the updated data is a printer page count, the processor may update the allocated memory area by blowing one bit in the allocated memory area for each page that is printed. If the updated data is printer cartridge identification data, the processor may update the allocated memory area by writing updated data to an unused memory block in the allocated memory area. The processor may identify valid printer cartridge identification data based on an index of bits, wherein each bit corresponds to a respective memory block. The apparatus may further comprise an application specific integrated circuit having the processor and the OTP non-rewritable data storage device. The processor may be selected from a group consisting of: a hardware processor, a firmware processor, and a software processor.

A method comprises updating an allocated memory area in a one-time programmable (OTP) data storage device by writing updated data to unused areas of the allocated memory area, and distinguishing the updated data from out-of-date data previously stored in the allocated memory area. The method may also include one or more of the following acts: distinguishing the updated data from the out-of-date data by locating a first unblown bit in the allocated memory area; locating the first unblown bit in the allocated memory area by incrementing a pointer value and determining whether respective corresponding bits are unblown until the pointer value corresponds to an unblown bit; distinguishing the updated data from the out-of-date data by locating a first unblown bit in an index in the data storage device; updating the index by locating a first unblown bit in the index and blowing the unblown bit when the allocated memory area is updated by writing the updated data to an unused data block; and/or determining whether the allocated memory area includes unused data blocks based on an index of bits, wherein each bit corresponds to a respective data block. The index may include a plurality of bits that correspond to respective data blocks in the allocated memory area. Examples of data that may be updated include a printer page count, a printer identification, universal serial bus endpoint data, and printer cartridge identification data. Any other type of updatable data may be updated. If the updated data is a printer page count, the method may further include updating the allocated memory area by blowing one bit in the allocated memory area for each page that is printed. If the updated data is printer cartridge identification data, the method may include updating the allocated memory area by writing the updated data to an unused memory block in the allocated memory area and identifying valid printer cartridge identification data based on an index of bits, wherein each bit corresponds to a respective memory block.

An apparatus comprises one or more of: means for updating an allocated memory area in a one-time programmable (OTP) data storage device; means for distinguishing the updated data from out-of-date data previously stored in the allocated memory area; means for distinguishing the updated data from the out-of-date data by locating a first unblown bit in the allocated memory area; means for locating the first unblown bit in the allocated memory area by incrementing a pointer value and determining whether respective corresponding bits are unblown until the pointer value corresponds to an unblown bit; means for distinguishing the updated data from the out-of-date data by locating a first unblown bit in an index in the data storage device; means for updating the index by locating a first unblown bit in the index and blowing the unblown bit when the allocated memory area is updated by writing the updated data to an unused data block; and/or means for determining whether the allocated memory area includes unused data blocks based on an index of bits, wherein each bit corresponds to a respective data block.

A computer readable storage medium has processor executable instructions to: update an allocated memory area in a data storage device by writing updated data to unused areas of the allocated memory area; distinguish updated data from out-of-date data previously stored in the allocated memory area; distinguish updated data from the out-of-date data by locating a first unblown bit in the allocated memory area; locate the first unblown bit in the allocated memory area by incrementing a pointer value and determining whether respective corresponding bits are unblown until the pointer value corresponds to an unblown bit; distinguish the updated data from the out-of-date data by locating a first unblown bit in an index in the data storage device; update the index by locating a first unblown bit in the index and blowing the unblown bit when the allocated memory area is updated by writing the updated data to an unused data block; and/or determine whether the allocated memory area includes unused data blocks based on an index of bits, wherein each bit in the index corresponds to a respective data block.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

DETAILED DESCRIPTION OF THE PRESENTLY PREFERRED EMBODIMENTS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

The embodiments below relate to an updateable, one-time programmable (non-rewritable) non-volatile storage device ("OTP"). The OTP is segmented so that updated data may be written to unused areas. Valid data may be distinguished from stale data (also referred to as out-of-date data) in the OTP using a valid data recognition technique such as tallying or indexing. According to a tallying technique, an updated event count may be obtained by counting the number of blown bits in the OTP; each time the event occurs, the next bit is blown. The number of blown bits corresponds to the event count. According to an indexing technique, each bit in an index corresponds to an allocated data block in the OTP. When updated data is written to the next (empty) data block in order in the OTP, the corresponding (next) index bit is blown. The most recently updated data set may be located in the OTP by counting the number of blown bits in the index and then correlating the count to a data block. By utilizing non-rewritable OTP for storing and updating data in an integrated circuit, a manufacturer may avoid the additional manufacturing steps and costs required to implement rewritable non-volatile memory.

Figure 1A:
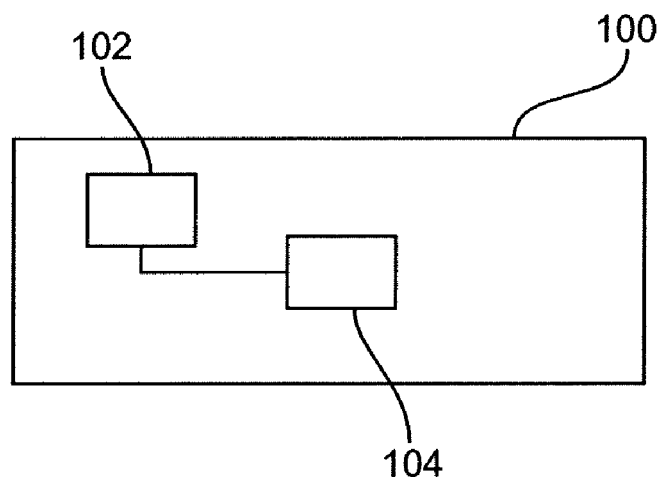
FIG. 1(a) is a block diagram illustrating a circuit that updates data stored in a one-time programmable storage device, according to an embodiment.
Figure 1B:
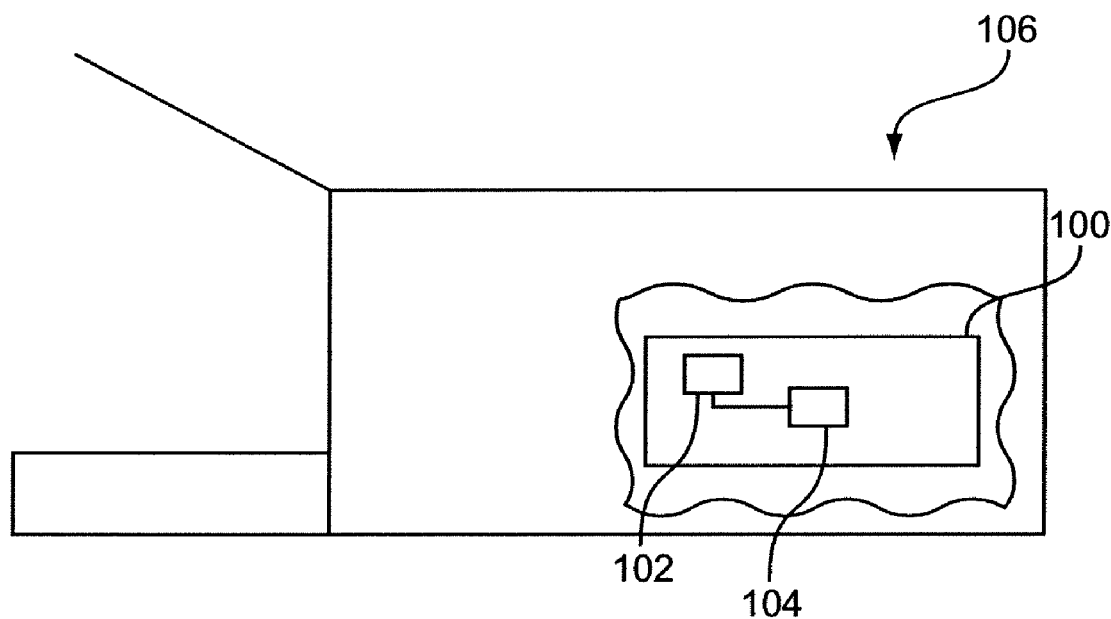
FIG. 1(b) illustrates a device that may implement the circuit of FIG. 1(a)

FIG. 1(a) illustrates a circuit 100 that includes a one-time programmable (non-rewritable) storage device 102 and a processor 104. The one-time programmable storage device 102 (hereinafter referred to as an "OTP") may be a one-time programmable read only memory (one-time PROM), as an example. A one-time PROM is a storage device having all bits in a pre-programmed state, such as all "0s". Each bit may be implemented as a fuse. Data is written to the one-time PROM by burning select fuses; a process that is irreversible in a one-time PROM. In the circuit of FIG. 1(a), the OTP 102 stores data and the processor 104 updates the data by writing updates to unused areas of the OTP 102. The previous set of data is considered stale, and the updated data is considered the valid data. The processor 104 may implement a tracking technique, such as indexing, to locate valid data in the OTP 102 during a read operation and/or to locate an unused area of the OTP 102 for a write operation, as explained below. The processor 104 may be a hardware, firmware, and/or software type data processor. The circuit 100 may be implemented in any type of device, such as a printer 106 as illustrated in FIG. 1(b).

Figure 2:
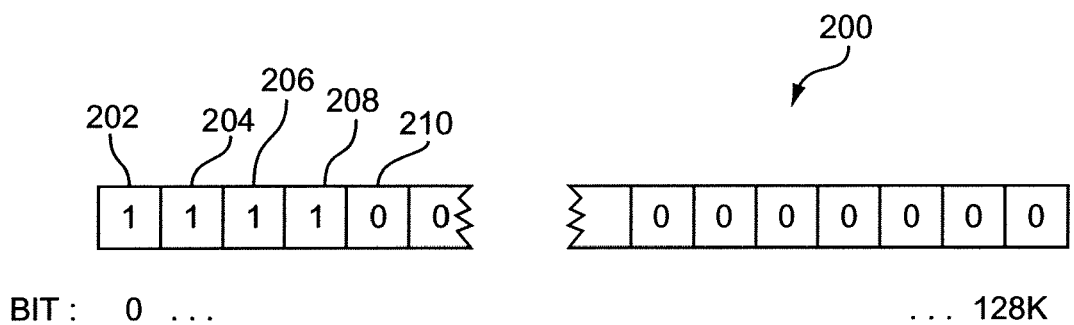
FIG. 2 illustrates a tallying technique for updating data in a one-time programmable storage device, according to an embodiment.

FIG. 2 illustrates a tallying technique for locating and reading valid data from and writing updated data to an OTP 102. The tallying technique may be used to count the number of occurrences of a detectable event, as an example. In the illustrated example, the OTP 102 has 128 Kbits 200 of tally memory designated for use to tally a count. However, it is to be understood that the OTP 102 may reserve any amount of memory to tally a count. The amount of reserved memory may be determined at the design stage of a system, may be based on an anticipated limit of the total number of occurrences of the event, or may be based on other factors. By way of example, a system designer may determine that a printer model will print no more than 128,000 pages before printer components become so worn that the printer is no longer useable. In this case, 128 Kbits of OTP 102 is sufficient to tally the page count for the life of the printer.

Each time the event occurs (such as a page being printed) a bit is blown in the OTP 102 tally memory to update the event count. The processor 104 may determine the next bit to blow (when the event reoccurs) by locating the first unblown bit in the tally memory, and may determine the current event count by counting the number of blown bits in the tally memory. In the illustrated example, the first four bits 202, 204, 206, and 208 are blown and the fifth bit 210 is the first unblown bit. To determine the event count, the processor 104 locates and identifies the first unblown bit (the fifth bit) and subtracts one. In this example, the event occurred four times. When the event occurs a fifth time, the processor 104 blows the fifth bit 210.

Figure 3:
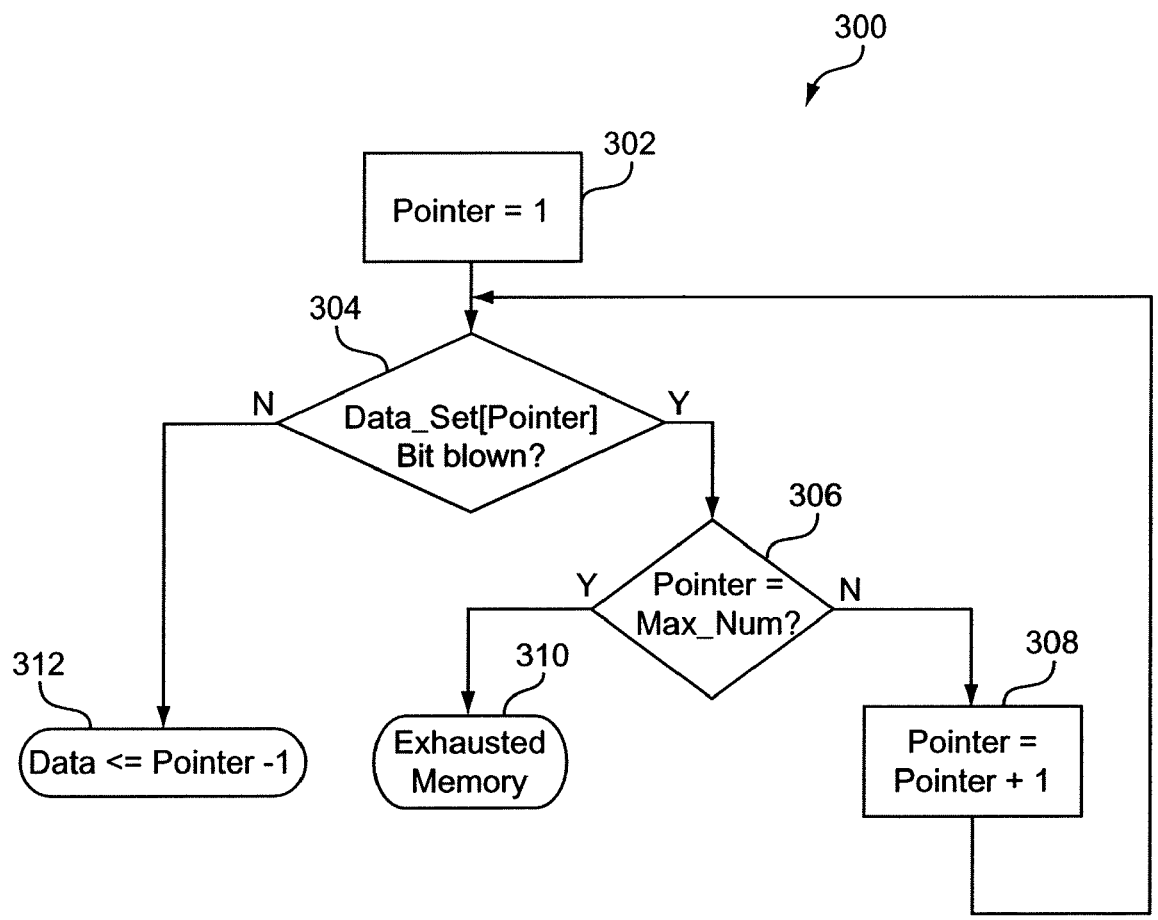
FIG. 3 is a flow chart showing tallying acts for updating data in a one-time programmable storage device, according to an embodiment.

FIG. 3 shows acts 300 that may be executed by a processor 104 to tally an event occurrence by storing count data in an OTP 102, according to an embodiment. The processor 104 sets a data set pointer to "one" to point to the first bit in the OTP 102 (Act 302). Acts 304, 306, and 308 are repeated until the first unblown bit in the OTP 102 is located. If the processor 104 determines that the current bit is blown (Act 304) and that the data set pointer does not point to the last bit in the OTP 102 (Act 306), the pointer is incremented by one (Act 308). The processor 104 continues to increment the pointer and read each bit until the first blown bit is located. The processor 104 determines the event occurrence by subtracting one from the pointer value at the first unblown bit (Act 312). For updating the event count when the event occurs, the processor 104 blows the first unblown bit. The processor 104 determines that the space allocated in the OTP 102 for an event is exhausted (i.e., no more unblown bits remain) when the pointer value is equal to the total number of bits allocated to the event count ("Max_Num") (Act 310). In this case, the processor 104 may determine that the OTP 102 data for the event is invalid.

Figure 4:
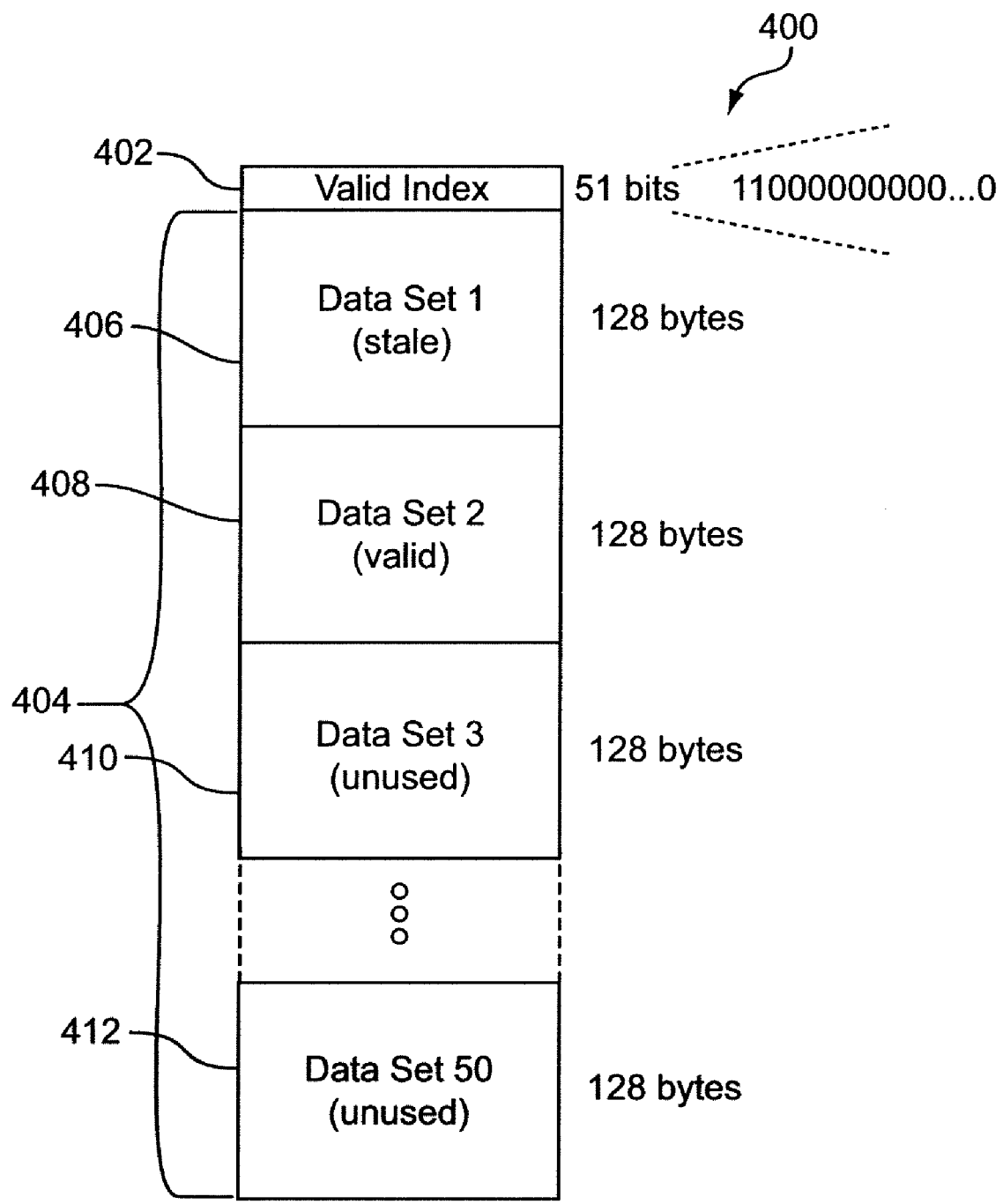
FIG. 4 illustrates an indexing technique for updating data in a one-time programmable storage device, according to an embodiment.

FIG. 4 illustrates an indexing technique 400 for locating valid data and updating data in an OTP 102, according to an embodiment. The indexing technique may be used to store any type of updateable data in the OTP 102. The OTP 102 is segmented into two areas, a valid index area 402 and a data set area 404. The valid index area 402 holds a data set index. The data set index includes a set of bits. Each bit corresponds to a data set in the data set area 404. The bit-size of the valid index area 402 may be one more than the total number of anticipated data set updates (i.e., one more than the total number of segmented data blocks in the data set area 404). Each updated data set is written to a subsequent data block in the data set area 404. For example, the first data set is written to data block 406, the second data set (of updated data) is written to data block 408, the third data set (of updated data) is written to data block 410, and so on. In the illustrated example, each data block has 128 bytes allocated for the updateable data. It is understood that the data blocks could be another size, depending on the application and the type of data to be stored and updated.

In the printer example, the processor 104 may write to each data block in the data set area 404 an identification number of a replaceable print cartridge installed in a printer. Over time, each data block will retain an identification number of a previously or currently installed print cartridge. The first print cartridge identification number may be written to data block 406. When the first print cartridge is replaced, a second print cartridge identification number may be written to data block 408, and so on. In this example, the size of each data block allocated in the data set area 404 is based on a maximum print cartridge identification number length. The size of the data set area 404 and the size of each data block may be determined during the design stage of the circuit 100 based on the type of data to be stored, as an example.

In the illustrated example, the data set index in the valid index area 402 has 51 bits. The first bit in the data set index is blown when the first data set is written to the first data block 406. The second bit is blown when the second data set is written to the second data block 408. The processor 104 determines that the first data set is stale if the second bit is blown. The first unblown bit in the data set index points to the first unused data block. The valid data set is the data set in the data block immediately before the first unused data block. In the illustrated example, the first two bits in the data set index are blown (11000000000 . . . 0), indicating that the data set in data block 406 is stale (outdated data), the data set in data block 408 is valid (current), and each subsequent data block 410 to 412 is unused. The processor 104 may write an updated data set to data block 410, and blow the third bit in the valid index area 402.

Figure 5:
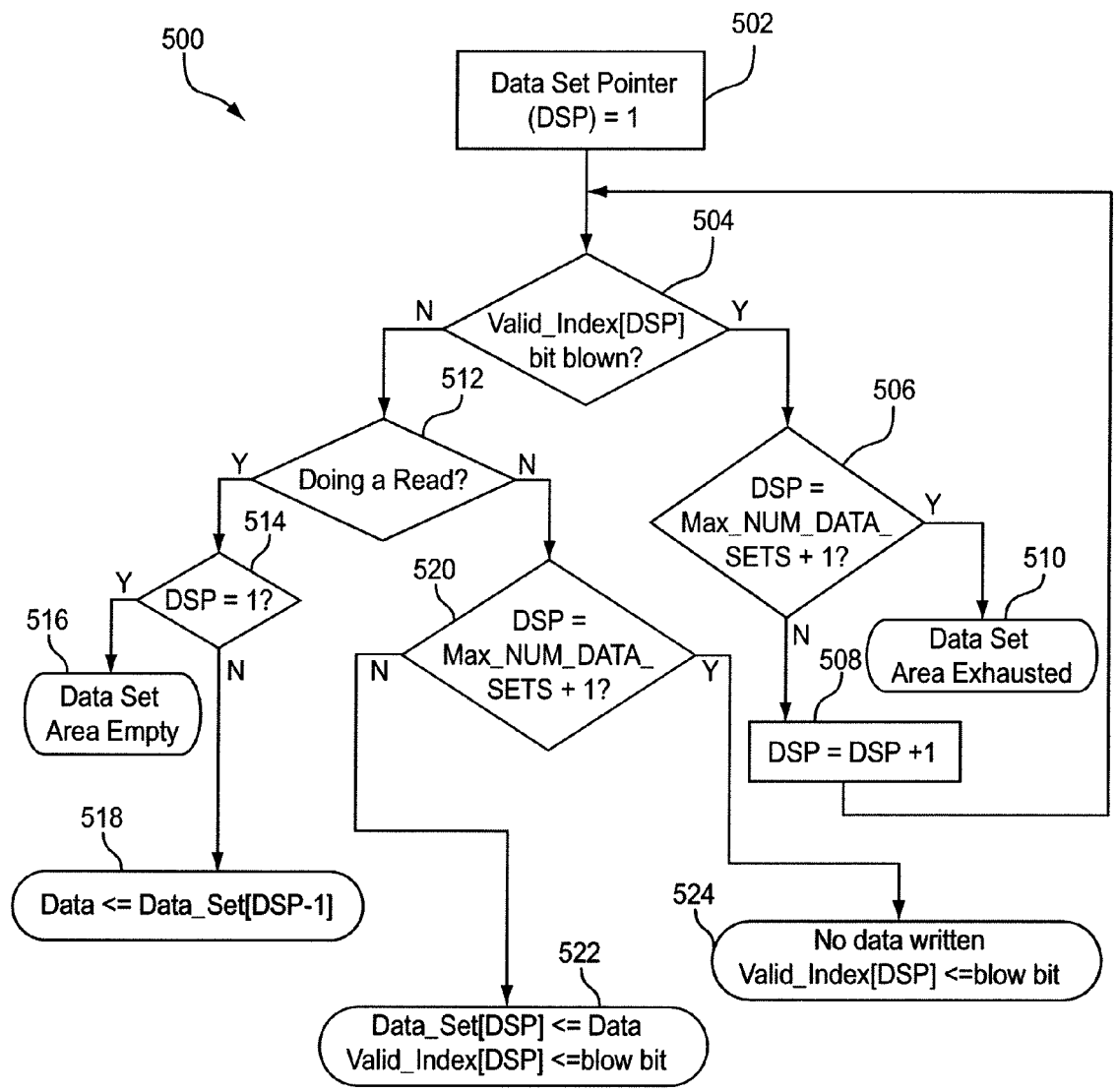
FIG. 5 is a flow chart showing indexing acts for updating data in a one-time programmable storage device, according to an embodiment.

FIG. 5 shows acts 500 that may be executed by a processor 104 for indexing to a valid data block in an OTP 102, according to an embodiment. The processor 104 sets a data set pointer to "one" to correspond to the first bit in the data set index (Act 502) and determines if the first bit is blown: "Valid_Index[1] bit blown?" Acts 504, 506, and 508 are repeated to increment the data set pointer and read each corresponding bit in the data set index until the first unblown bit is located.

Act 506 is executed to determine whether the data set area 404 is exhausted. The data set index includes one more bit than the total number of anticipated data set updates (i.e., one more bit than the total number of blocks in the data set area 404) to indicate when the last data block 412 holds valid data. When the data set area 404 overflows, the last bit in the data set index is blown to indicate that the data set area is exhausted (Act 510).

The first unblown bit in the data set index is located (Act 504) to either read a valid data set from the data set area 404 or to write updated data to the next unused data block (Act 512). During a read operation, provided the data set pointer does not point to the first bit in the data set index (which would indicate that the first bit is not blown and therefore the data set area 404 is empty (Acts 514 and 516)), the valid data is retrieved from the data block corresponding to the last blown bit (Act 518). During a write operation, the processor 104 determines whether the data set pointer is pointing to the last bit in the data set index (Act 520). If the data set pointer is pointing to the last bit in the data set index, there is no space to write the updated data and the last bit is blown to indicate that the data set area is exhausted (Act 524). If the data set pointer is not pointing to the last bit in the data set index, the updated data is written to the first unused block in the data set area 404 and the current bit in the data set index is blown to indicate that the corresponding block is valid (Act 522).

A circuit 100 may implement OTP 102 for storing one or more different updateable data types. If more than one updateable data type is stored, the OTP 102 may be segmented into multiple areas. Each area may be configured so that its data may be updated through an updating technique. The tallying and indexing techniques discussed above provide examples of ways to update data in an OTP 102. Other OTP updating techniques may be implemented that account for parameters of the updated data, including but not limited to the data type, data size, update frequency, and/or other factors.

By way of example, OTP 102 may be used to store and update different types of printer data for a printer 106. The following non-exhaustive types of printer data may be stored in OTP 102: (a) the printer serial number assigned during printer assembly; (b) USB endpoint information to identify the printer's function; (c) print cartridge identification data; and (d) total page count. The printer serial number and the USB endpoint information will not change through the life of the printer. The print cartridge information changes only when a cartridge is replaced. For most printers, cartridges are replaced no more than 100 times through the life of the printer. The total page count is also limited by the life of the printer and is maintained primarily for warranty purposes. In this example, it may be assumed that the printer model has a stated duty of 3,000 pages per month with a maximum warranty period of 36 months. This equates to allocating 108,000 bits of OTP 102 for page count data. Table 1 summarizes the amount of OTP 102 required (OTP Space Allocated) for each type of printer data in this example. The amount is based on the size of each data type and a maximum number of updates allowed (i.e., rewrites) for each data type.

TABLE 1

OTP Data Allocation for a Printer (example)

| Data Type | Size | Updates Allowed | OTP Space Allocated | Stable or Updateable |
| --- | --- | --- | --- | --- |
| Printer Serial No. | 30 bytes | 0 | 30 bytes | Stable data |
| USB Endpoint Data | 256 bytes | 1 | 512 + 1 bytes | Stable data; Extra byte to indicate valid data set |
| Cartridge Tracking | 128 bytes | 50 | 6400 + 7 bytes | Updateable data; Extra 7 bytes for valid index |
| Pages Printed | 1 bit | 128K | 128 Kbits | Updateable data; Tallied |

The printer serial number and the USB endpoint data are stable data types and are known to not change through the life of a printer. However, extra space may be allocated for stable data to remedy a write error to the OTP. In Table 1, extra space (256 bytes) has been allocated for the USB endpoint data and one additional byte has been allocated to indicate the valid data set (i.e., the first 256 bytes or the second 256 bytes of the USB endpoint data). Cartridge tracking data is updateable and requires an OTP block to accommodate cartridge identification information (e.g., serial number). Because the cartridge identification information is large, OTP space may be allocated according to the indexing technique discussed above with reference to FIGS. 4 and 5. Pages printed data is also updateable, but using the tallying technique discussed above with reference to FIGS. 2 and 3 provides an efficient use of OTP space for this data type. It is to be understood that other types of printer data and other types of data, in addition to the examples discussed above, may also be stored and updated using one or more of the techniques discussed above.

Referring now to FIGS. 6(*a*) to 6(*h*), various exemplary implementations of the present invention are shown. Referring to FIG. 6(*a*), the present invention may be embodied in a hard disk drive (HDD) 600. HDD 600 may communicate with a host device (not shown) such as a computer, mobile computing devices such as personal digital assistants, cellular phones, media or MP3 players and the like, and/or other devices via one or more wired or wireless communication links 608.

The present invention may be implemented with either or both signal processing and/or control circuits, which are generally identified in FIG. 6(*a*) at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606. HDD 600 may be connected to memory 609, such as random access memory (RAM), a low latency nonvolatile memory such as flash memory, read only memory (ROM) and/or other suitable electronic data storage.

Referring now to FIG. 6(*b*), the present invention may be implemented in a digital versatile disc (DVD) drive 610. The present invention may be implemented in either or both signal processing and/or control circuits, which are generally identified in FIG. 6(*b*) at 612, and/or mass data storage 618 of DVD drive 610. Signal processing and/or control circuit 612 and/or other circuits (not shown) in DVD drive 610 may process data, perform coding and/or encryption, perform calculations, and/or format data that is read from and/or data written to an optical storage medium 616. In some implementations, signal processing and/or control circuit 612 and/or other circuits (not shown) in DVD drive 610 can also perform other functions such as encoding and/or decoding and/or any other signal processing functions associated with a DVD drive.

DVD drive 610 may communicate with a device (not shown) such as a computer, television or other device via one or more wired or wireless communication links 617. DVD drive 610 may communicate with mass data storage 618 that stores data in a nonvolatile manner. Mass data storage 618 may include a HDD such as that shown in FIG. 6(*a*). The HDD may be a mini HDD that includes one or more platters having a diameter that is smaller than approximately 1.8". DVD drive 610 may be connected to memory 619, such as RAM, ROM, low latency nonvolatile memory such as flash memory, and/or other suitable electronic data storage.

Referring now to FIG. 6(*c*) the present invention may be embodied in a high definition television (HDTV) 620. The present invention may be implemented in either or both signal processing and/or control circuits, which are generally identified in FIG. 6(*c*) at 622, a WLAN interface 629 and/or mass data storage 627 of the HDTV 620. HDTV 620 may receive HDTV input signals in either a wired or wireless format via one or more wired or wireless communication links 624 and generate HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. At least one HDD may have the configuration shown in either FIG. 6(*a*) and/or at least one DVD may have the configuration shown in FIG. 6(b). The HDD may be a mini HDD that includes one or more platters having a diameter that is smaller than approximately 1.8". HDTV 620 may be connected to memory 628 such as RAM, ROM, low latency nonvolatile memory such as flash memory and/or other suitable electronic data storage. HDTV 620 also may support connections with a WLAN via a WLAN network interface 629.

Figure 6A:
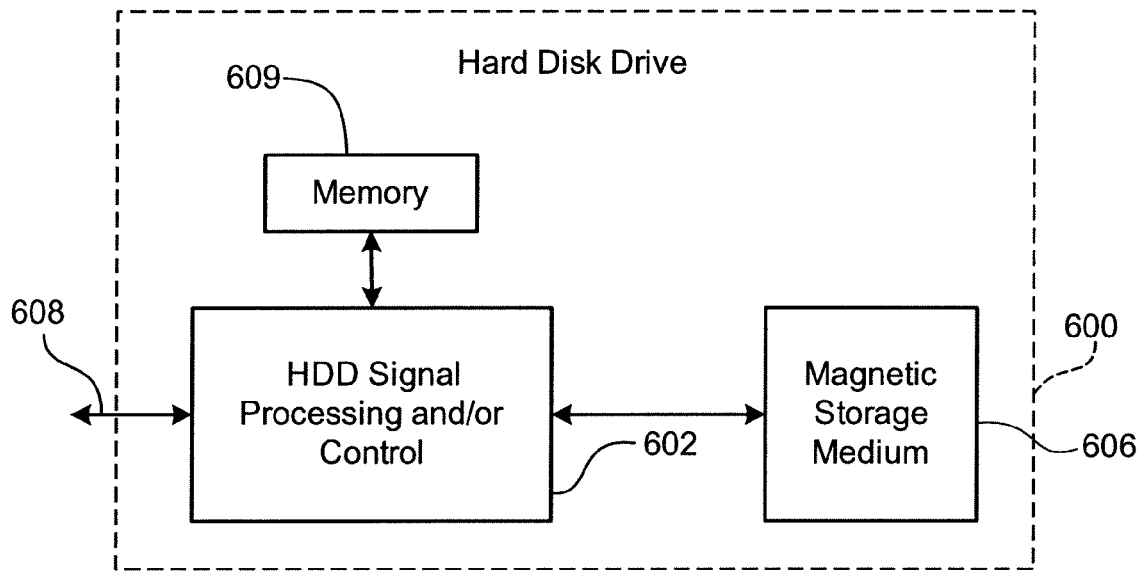
FIG. 6(a) is a functional block diagram of a hard disk drive.
Figure 6B:
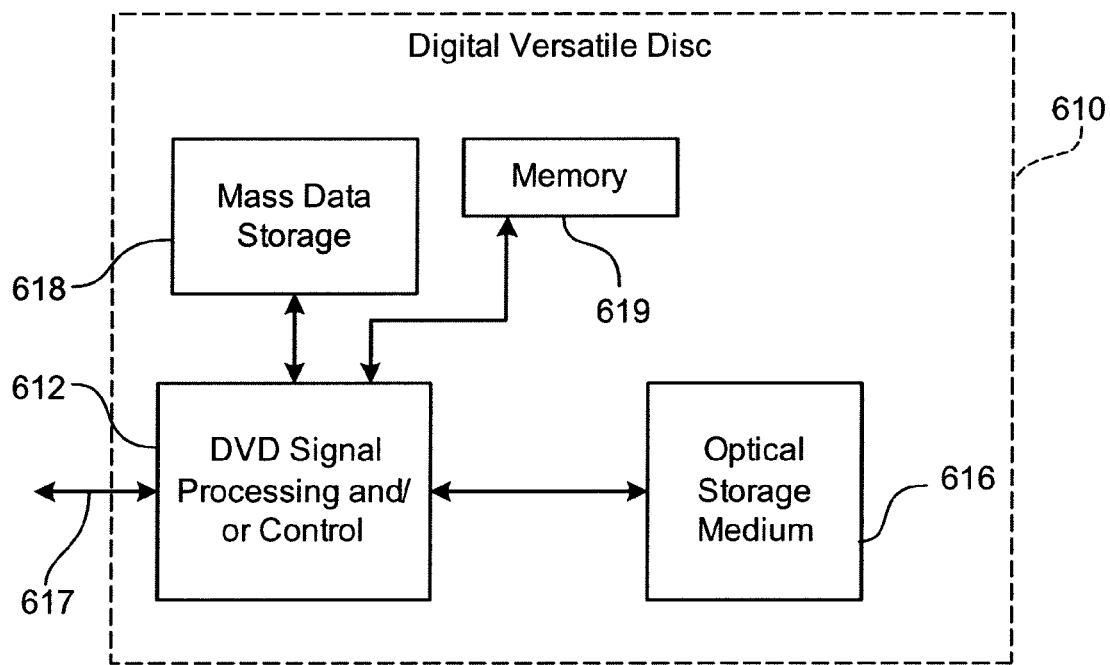
FIG. 6(b) is a functional block diagram of a digital versatile disk (DVD)
Figure 6C:
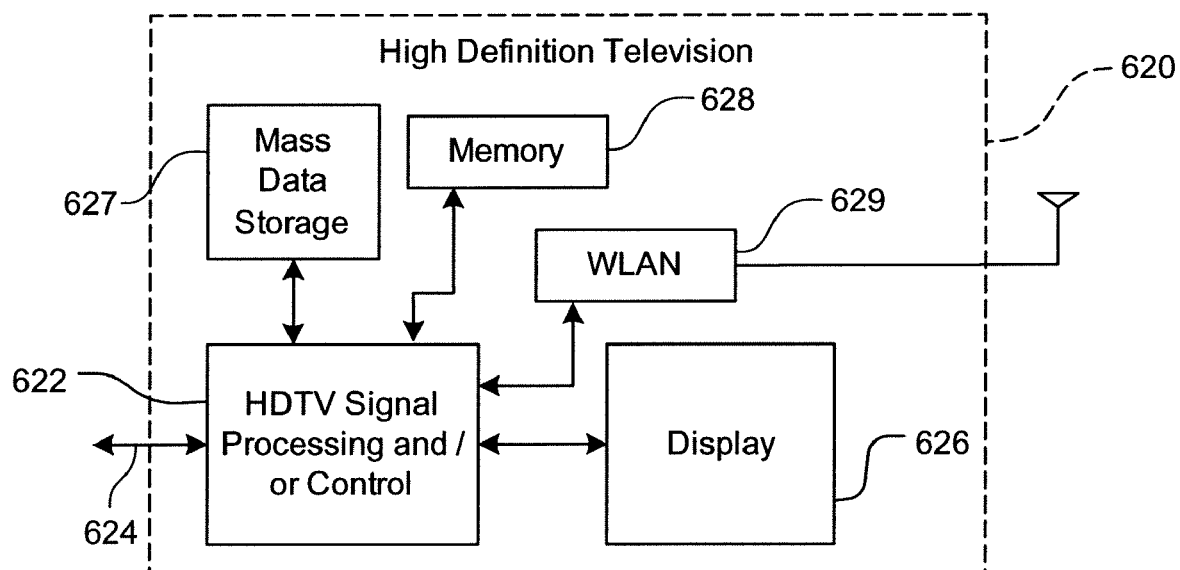
FIG. 6(c) is a functional block diagram of a high definition television.
Figure 6D:
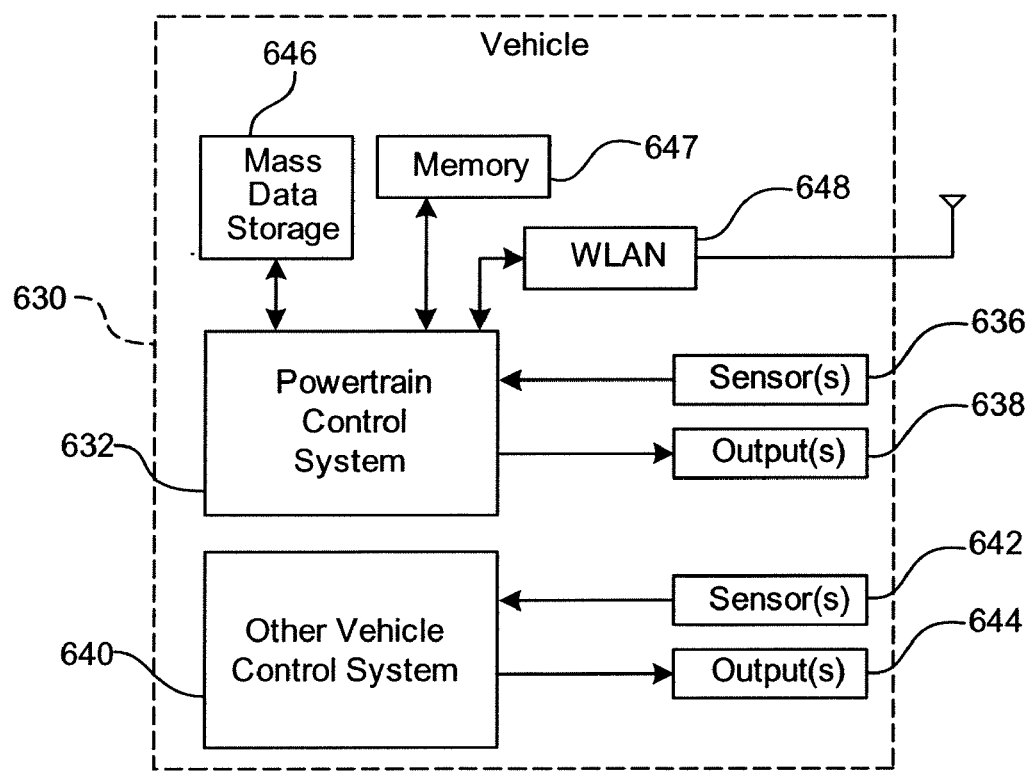
FIG. 6(d) is a functional block diagram of a vehicle control system.

Referring now to FIG. 6(d), the present invention may be implemented in a control system of a vehicle 630, a WLAN interface 648 and/or mass data storage 646 of the vehicle control system. In some implementations, the present invention is implemented in a power-train control system 632 that receives inputs from one or more sensors 636 such as temperature sensors, pressure sensors, rotational sensors, airflow sensors and/or any other suitable sensors and/or that generates one or more output control signals such as engine operating parameters, transmission operating parameters, and/or other control signals at one or more output(s) 638.

The present invention may also be embodied in other control systems 640 of vehicle 630. Control system 640 may likewise receive signals from input sensors 642 and/or output control signals to one or more output(s) 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices, for example HDDs and/or DVDs. At least one HDD may have the configuration shown in FIG. 6(a) and/or at least one DVD may have the configuration shown in FIG. 6(b). The HDD may be a mini HDD that includes one or more platters having a diameter that is smaller than approximately 1.8". Powertrain control system 632 may be connected to memory 647 such as RAM, ROM, low latency nonvolatile memory such as flash memory and/or other suitable electronic data storage. Powertrain control system 632 also may support connections with a WLAN via a WLAN network interface 648. The control system 640 may also include mass data storage, memory and/or a WLAN interface (all not shown).

Figure 6E:
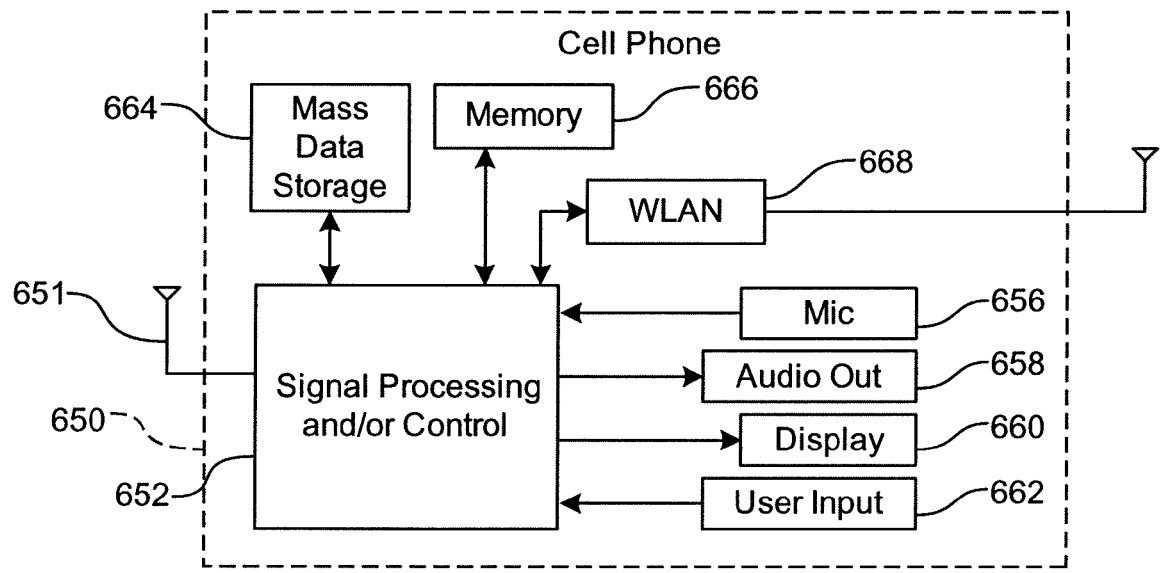
FIG. 6(e) is a functional block diagram of a cellular phone.

Referring now to FIG. 6(e), the present invention may be embodied in a cellular phone 650 that may include a cellular antenna 651. The present invention may be implemented in either or both signal processing and/or control circuits, which are generally identified in FIG. 6(e) at 652, a WLAN interface and/or mass data storage of the cellular phone 650. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Cellular phone 650 may communicate with mass data storage 664 that stores data in a nonvolatile manner such as optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8". Cellular phone 650 may be connected to memory 667 such as RAM, ROM, low latency nonvolatile memory such as flash memory and/or other suitable electronic data storage. Cellular phone 650 also may support connections with a WLAN via a WLAN network interface 668.

Figure 6F:
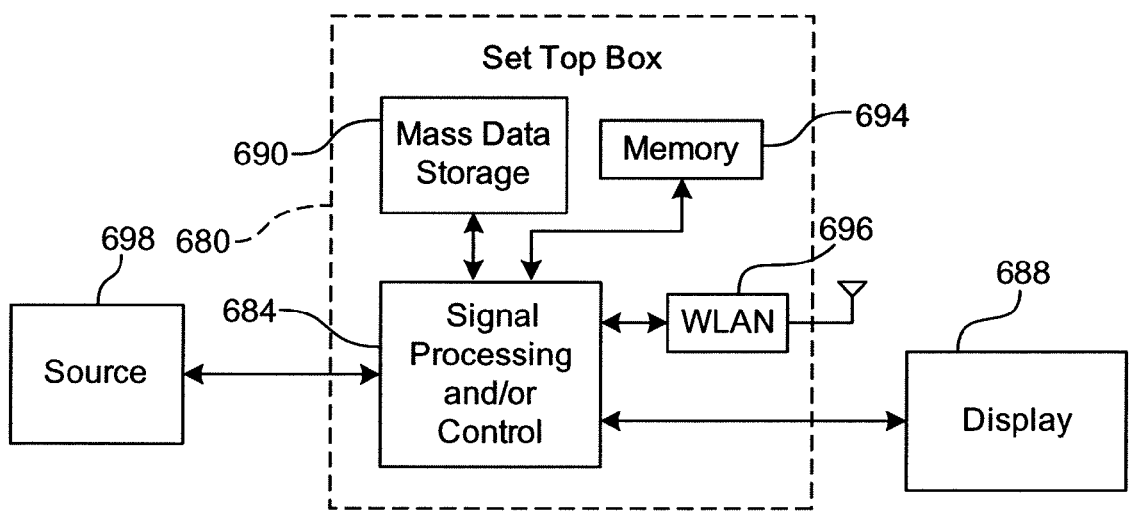
FIG. 6(f) is a functional block diagram of a set top box.

Referring now to FIG. 6(f), the present invention may be embodied in a set top box 680. The present invention may be implemented in either or both signal processing and/or control circuits, which are generally identified in FIG. 6(f) at 684, a WLAN interface and/or mass data storage of the set top box 680. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8". Set top box 680 may be connected to memory 694 such as RAM, ROM, low latency nonvolatile memory such as flash memory and/or other suitable electronic data storage. Set top box 680 also may support connections with a WLAN via a WLAN network interface 696.

Figure 6G:
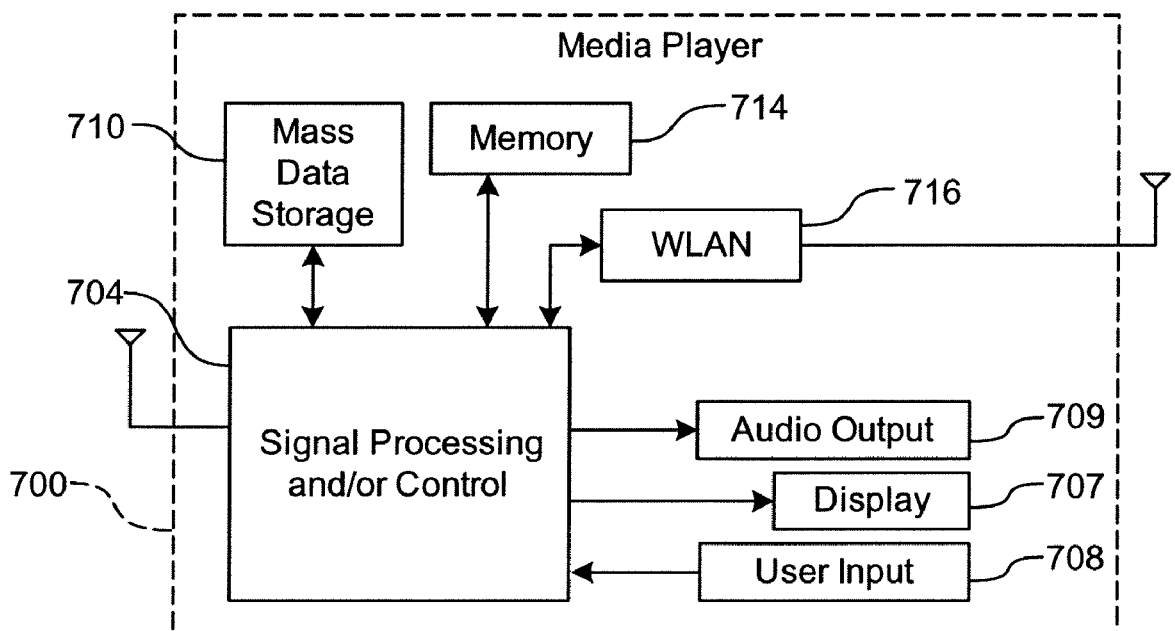
FIG. 6(g) is a functional block diagram of a media player.

Referring now to FIG. 6(g), the present invention may be embodied in a media player 700. The present invention may be implemented in either or both signal processing and/or control circuits, which are generally identified in FIG. 6(g) at 704, a WLAN interface and/or mass data storage of the media player 700. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage 710 may include optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8".

Media player 700 may be connected to memory 714 such as RAM, ROM, low latency nonvolatile memory such as flash memory and/or other suitable electronic data storage. Media player 700 also may support connections with a WLAN via a WLAN network interface 716. Still other implementations in addition to those described above are contemplated.

Figure 6H:
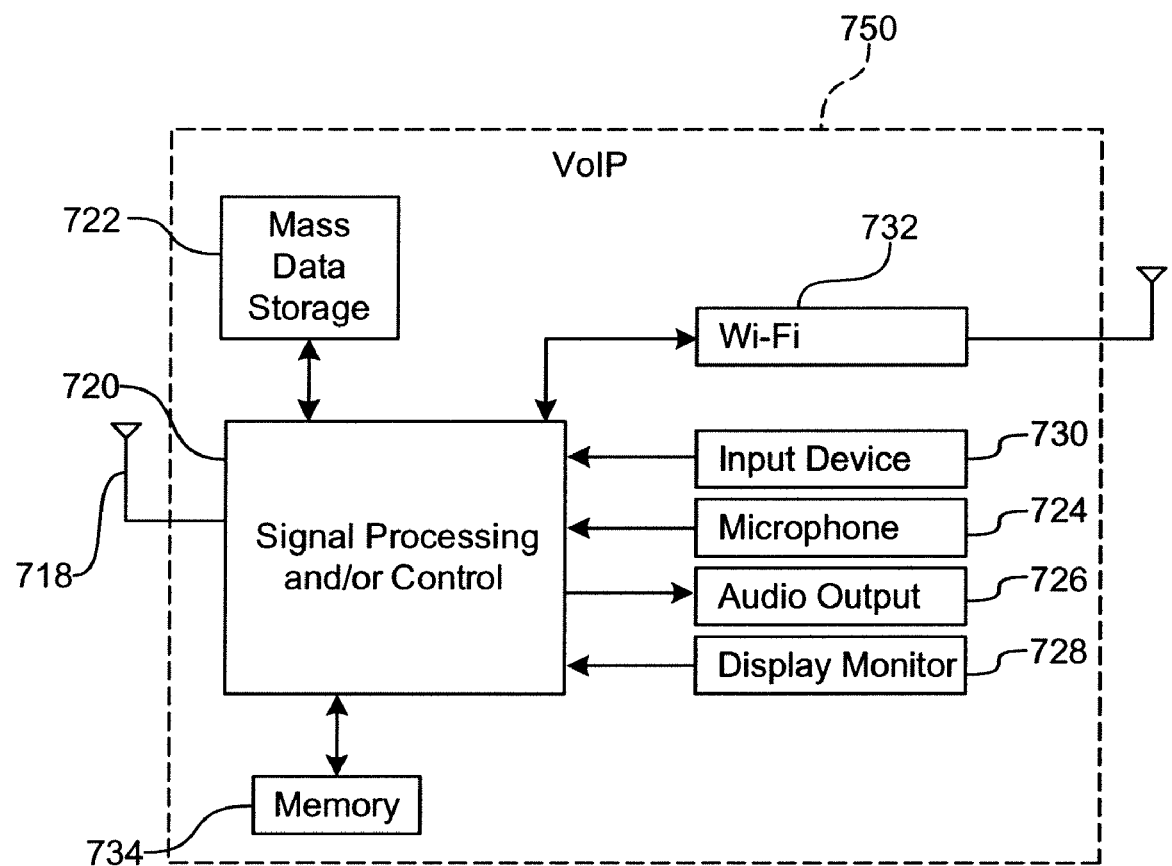
FIG. 6(h) is a functional block diagram of a VoIP phone.

Referring to FIG. 6(h), the present invention may be embodied in a Voice over Internet Protocol (VoIP) phone 750 that may include an antenna 718. The present invention may be implemented in either or both signal processing and/or control circuits, which are generally identified in FIG. 6(h) at 720, a wireless interface and/or mass data storage of the VoIP phone 750. In some implementations, VoIP phone 750 includes, in part, a microphone 724, an audio output 726 such as a speaker and/or audio output jack, a display monitor 728, an input device 730 such as a keypad, pointing device, voice actuation and/or other input devices, and a Wi-Fi communication module 732. Signal processing and/or control circuits 720 and/or other circuits (not shown) in VoIP phone 750 may process data, perform coding and/or encryption, perform calculations, format data and/or perform other VoIP phone functions.

VoIP phone 750 may communicate with mass data storage 722 that stores data in a nonvolatile manner such as optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8". VoIP phone 750 may be connected to memory 734, which may be a RAM, ROM, low latency nonvolatile memory such as flash memory and/or other suitable electronic data storage. VoIP phone 750 is configured to establish communications link with a VoIP network (not shown) via Wi-Fi communication module 732.

All of the discussion above, regardless of the particular implementation being described, is exemplary in nature, rather than limiting. Although specific components of the circuit 100 are described, methods, systems, and articles of manufacture consistent with the circuit 100 may include additional or different components. For example, components of the circuit 100 may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the circuit 100 may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the circuit may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A method for managing printer data using a one-time programmable (OTP) data storage device, the method comprising: writing first printer data for operating a printer to a first area in an OTP data storage device; determining that the first printer data is no longer current; writing updated printer data for operating the printer to a second area in the OTP data storage device; marking the first area in the OTP data storage as no longer containing printer data for operating the printer; and determining a location within the OTP where the updated printer data is stored by locating a first unblown bit in an allocated memory area of the OTP data storage device.

2. The method of claim 1 further comprising locating the first unblown bit in the allocated memory area by continuously incrementing a pointer and determining whether each respective corresponding bit is unblown until the pointer corresponds to an unblown bit.

3. The method of claim 1 further comprising determining a location within the OTP where the updated printer data is stored by locating a first unblown bit in an index in the OTP data storage device.

4. The method of claim 3 wherein the index includes a plurality of bits corresponding to respective data areas in the OTP data storage device.

5. The method of claim 4 further comprising updating the index by locating a first unblown bit in the index and blowing the unblown bit when the updated printer data is written to the second area in the OTP data storage device.

6. The method of claim 1 further comprising determining whether the OTP data storage device includes unused data areas based on an index of bits, wherein each bit in the index corresponds to a respective data area.

7. The method of claim 1 wherein the printer data includes universal serial bus endpoint data.

8. The method of claim 1 wherein the printer data is a printer page count, the method further comprising updating the printer page count by blowing one bit in an allocated memory area of the OTP data storage device for each page that is printed.

9. The method of claim 1 wherein the printer data is printer cartridge identification data, the method further comprising updating the printer cartridge identification data by writing updated printer cartridge identification data to an unused memory area in the OTP data storage device and identifying the updated printer cartridge identification data based on an index of bits, wherein each bit corresponds to a respective memory area.

10. An integrated circuit (IC) comprising:
a one-time programmable (OTP) data storage device; and
logic to: write first printer data for operating a printer to a first area in the OTP data storage device; determine that the first printer data is not longer current; writing updated printer data for operating the printer to a second area in the OTP data storage device; mark the first area in the OTP data storage as no longer containing printer data for operating the printer; and determines a location within the OTP where the updated printer data is stored by locating a first unblown bit in an allocated memory area of the OTP data storage device.

11. The IC of claim 10 wherein the logic locates the first unblown bit in the allocated memory area by continuously incrementing a pointer and determining whether each respective corresponding bit is unblown until the pointer corresponds to an unblown bit.

12. The IC of claim 10 wherein the logic determines a location within the OTP where the updated printer data is stored by locating a first unblown bit in an index in the OTP data storage device.

13. The IC of claim 12 wherein the index includes a plurality of bits corresponding to respective data areas in the OTP data storage device.

14. The IC of claim 13 wherein the logic updates the index by locating a first unblown bit in the index and blowing the unblown bit when the updated printer data is written to the second area in the OTP data storage device.

15. The IC of claim 10 wherein the logic determines whether the OTP data storage device includes unused data areas based on an index of bits, wherein each bit in the index corresponds to a respective data area.

16. The IC of claim 10 wherein the printer data includes universal serial bus endpoint data.

17. The IC of claim 10 wherein the printer data is a printer page count and the logic updates the printer page count by blowing one bit in an allocated memory area of the OTP data storage device for each page that is printed.

18. The IC of claim 10 wherein the printer data is printer cartridge identification data and the logic updates the printer cartridge identification data by writing updated printer cartridge identification data to an unused memory area in the OTP data storage device and identifies the updated printer cartridge identification data based on an index of bits, wherein each bit corresponds to a respective memory area.

19. The IC of claim 10 wherein the logic is selected from a group consisting of: a hardware processor, a firmware processor, a software processor, and processor executable instructions stored in computer readable media.

20. A printer comprising the IC of claim 10.

* * * * *